United States Patent
Choquier et al.

(10) Patent No.: US 7,657,580 B2
(45) Date of Patent: *Feb. 2, 2010

(54) SYSTEM AND METHOD PROVIDING VIRTUAL APPLICATIONS ARCHITECTURE

(75) Inventors: Philippe Choquier, Kirkland, WA (US); Quentin J. Clark, Bellevue, WA (US); William D. Devlin, Redmond, WA (US); Lara N. Dillingham, Seattle, WA (US); Cameron J. A. Ferroni, Seattle, WA (US); Justin Grant, Seattle, WA (US); Rodney T. Limprecht, Woodinville, WA (US); John F. Ludeman, Redmond, WA (US); Alexander E. Mallet, Bellevue, WA (US); Boyd C. Multerer, Seattle, WA (US); Martin J. Sleeman, Seattle, WA (US); Michael W. Thomas, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 314 days.

This patent is subject to a terminal disclaimer.

(21) Appl. No.: 11/185,147

(22) Filed: Jul. 20, 2005

(65) Prior Publication Data

US 2005/0262173 A1 Nov. 24, 2005

Related U.S. Application Data

(63) Continuation of application No. 09/714,568, filed on Nov. 16, 2000, now Pat. No. 6,961,681.

(60) Provisional application No. 60/231,874, filed on Sep. 12, 2000.

(51) Int. Cl.
G06F 12/00 (2006.01)
(52) U.S. Cl. .................................. 707/204; 712/25
(58) Field of Classification Search ................ 707/204, 707/203; 395/200.58; 364/550
See application file for complete search history.

(56) References Cited

U.S. PATENT DOCUMENTS

| | | | |
|---|---|---|---|
| 5,253,184 A * | 10/1993 | Kleinschnitz | ............... 702/184 |
| 5,742,286 A | 4/1998 | Kung | |
| 5,751,967 A * | 5/1998 | Raab et al. | ................... 709/228 |
| 5,819,028 A | 10/1998 | Manghirmalani et al. | 385/195.1 |
| 5,909,689 A * | 6/1999 | Van Ryzin | ................... 707/203 |

(Continued)

OTHER PUBLICATIONS

Hong An, et al., "A Java/CORBA Based Universal Framework for Super Server User -End Integrated Environments," Proceedings Technology of Object-Oriented Languages and Systems, 1999, p. 336-341.

(Continued)

*Primary Examiner*—Pierre M Vital
*Assistant Examiner*—Truong V Vo
(74) *Attorney, Agent, or Firm*—Workman Nydegger

(57) ABSTRACT

A virtual applications architecture is provided according to the present invention. The architecture includes a topology manager for managing applications across a plurality of members, and a virtual applications manager for defining a plurality of resources comprising the applications. The topology manager communicates with the plurality of members to initiate scaling of the applications associated with the virtual applications manager to the members. The architecture may also include a replication system for deploying the applications to the members.

19 Claims, 14 Drawing Sheets

U.S. PATENT DOCUMENTS

| | | | | |
|---|---|---|---|---|
| 5,920,700 | A | * | 7/1999 | Gordon et al. .............. 709/226 |
| 5,948,055 | A | * | 9/1999 | Pulsipher et al. ............ 709/202 |
| 5,956,489 | A | | 9/1999 | San Andres et al. ......... 709/221 |
| 6,064,666 | A | | 5/2000 | Willner et al. .............. 370/352 |
| 6,081,826 | A | * | 6/2000 | Masuoka et al. ............ 718/100 |
| 6,098,093 | A | * | 8/2000 | Bayeh et al. ................ 709/203 |
| 6,101,508 | A | * | 8/2000 | Wolff ......................... 709/223 |
| 6,271,845 | B1 | | 8/2001 | Richardson ................ 715/764 |
| 6,304,549 | B1 | | 10/2001 | Srinivasan et al. .......... 370/230 |
| 6,393,477 | B1 | | 5/2002 | Paxhia et al. ............... 709/223 |
| 6,415,323 | B1 | | 7/2002 | McCanne et al. ........... 709/225 |
| 6,456,306 | B1 | | 9/2002 | Chin et al. .................. 715/810 |
| 6,463,454 | B1 | | 10/2002 | Lumelsky et al. ........... 718/105 |
| 6,466,980 | B1 | | 10/2002 | Lumelsky et al. ........... 709/226 |
| 6,564,342 | B2 | | 5/2003 | Landan ......................... 714/48 |
| 6,578,069 | B1 | | 6/2003 | Hopmann et al. ........... 709/203 |
| 6,584,507 | B1 | | 6/2003 | Bradley et al. .............. 709/229 |
| 6,625,643 | B1 | | 9/2003 | Colby et al. ................ 709/217 |
| 6,643,555 | B1 | | 11/2003 | Eller et al. ..................... 700/83 |
| 6,691,151 | B1 | | 2/2004 | Cheyer et al. ............... 709/202 |
| 6,701,453 | B2 | | 3/2004 | Chrabaszcz ................... 714/13 |
| 6,732,170 | B2 | | 5/2004 | Miyake et al. .............. 709/223 |
| 6,768,901 | B1 | | 7/2004 | Osborn et al. ............... 455/230 |
| 6,801,949 | B1 | | 10/2004 | Bruck et al. | |
| 6,868,539 | B1 | | 3/2005 | Travison et al. ............. 717/100 |
| 6,922,724 | B1 | | 7/2005 | Freeman et al. | |
| 6,961,681 | B1 | * | 11/2005 | Choquier et al. ................ 703/2 |
| 7,032,022 | B1 | | 4/2006 | Shanumgam et al. | |
| 7,093,005 | B2 | | 8/2006 | Patterson | |
| 2001/0037302 | A1 | | 11/2001 | McFadzean et al. .......... 705/51 |
| 2001/0042118 | A1 | | 11/2001 | Miyake et al. | |
| 2002/0156866 | A1 | | 10/2002 | Schneider ................... 709/218 |
| 2002/0165745 | A1 | | 11/2002 | Greene et al. ................... 705/7 |
| 2002/0174227 | A1 | | 11/2002 | Hartsell et al. .............. 709/226 |
| 2002/0194251 | A1 | | 12/2002 | Richter et al. | |

OTHER PUBLICATIONS

Buyya R (Reprint), "PARMON: A Portable and Scalable Monitoring System for Clusters", Software-Practice & Experience, 2000, p. 723-739, vol. 30, No. 7.

M. Brune, et al., "Managing Clusters of Geographically Distributed High-Performance Computer", Concurrency: Practice and Experience, Jul. 1999, p. 887-911.

R. Butler, et al., "A National-Scale Authentication Infrastructure", Computer, Dec. 2000, pp. 60-66, vol. 33, No. 12.

R.E. Deemer, "Advanced Engineering Environments: Achieving the Vision," 2000 IEEE Aerospace Conference. Proceedings, Mar. 18-25, 2000, pp. 547-554, vol. 5.

Office Action dated Apr. 18, 2008 cited in U.S. Appl. No. 10/967,739.
Office Action dated Feb. 5, 2009 cited in U.S. Appl. No. 10/967,739.
Office Action dated Apr. 9, 2008 cited in U.S. Appl. No. 10/967,392.
Office Action dated Feb. 18, 2009 cited in U.S. Appl. No. 10/967,392.
Office Action dated Feb. 28, 2007 cited in U.S. Appl. No. 11/063,425.
Office Action dated Jun. 30, 2008 cited in U.S. Appl. No. 11/063,425.
Office Action dated Nov. 14, 2008 cited in U.S. Appl. No. 11/063,425.
Office Action dated Jul. 21, 2009 cited in U.S. Appl. No. 11/063,425.
OA Date Oct. 16, 2008 for U.S. Appl. No. 10/967,739, 23 pages.
OA Dated Oct. 16, 2008 for U.S. Appl. No. 10/967,392, 22 pages.

* cited by examiner

SYSTEM AND METHOD PROVIDING VIRTUAL APPLICATIONS ARCHITECTURE

CROSS-REFERENCE TO RELATED APPLICATIONS

This application is a continuation application of U.S. patent application Ser. No. 09/714,568, filed on Nov. 16, 2000 now U.S. Pat. No. 6,961,681 and entitled SYSTEM AND METHOD PROVIDING VIRTUAL APPLICATIONS ARCHITECTURE, which claims the benefit of U.S. Provisional Patent Application Ser. No. 60/231,874, filed on Sep. 12, 2000 and entitled SYSTEM AND METHOD PROVIDING VIRTUAL APPLICATIONS ARCHITECTURE. This application is also related to co-pending U.S. patent application Ser. No. 09/606,383, filed on Jun. 28, 2000, entitled USER INTERFACE TO DISPLAY AND MANAGE AN ENTITY AND ASSOCIATED RESOURCES, co-pending U.S. patent application Ser. No. 10/967,739, filed on Oct. 18, 2004, entitled, USER INTERFACE TO DISPLAY AND MANAGE AN ENTITY AND ASSOCIATED RESOURCES, co-pending U.S. patent application Ser. No. 10/967,392, filed on Oct. 18, 2004, entitled, USER INTERFACE TO DISPLAY AND MANAGE AN ENTITY AND ASSOCIATED RESOURCES, U.S. patent application Ser. No. 09/873,718, filed on Jun. 4, 2001, entitled, SYSTEM AND METHOD PROVIDING SINGLE APPLICATION IMAGE, which is now U.S. Pat. No. 6,868,539, co-pending U.S. patent application Ser. No. 11/063,425, filed Feb. 22, 2005, entitled, SYSTEM AND METHOD PROVIDING SINGLE APPLICATION IMAGE, The entireties of the aforementioned applications are incorporated herein by reference.

TECHNICAL FIELD

The present invention relates generally to computer systems, and more particularly to a system and method for providing a virtual application architecture wherein a plurality of members may be scaled to cooperate as an entity to service a network load and collectively provide a desired performance output level. Thus, the present invention enables virtual applications to be scaled, managed, and administered across the entity to service a desired load.

BACKGROUND

With the advent of Internet applications, computing system requirements and demands have increased dramatically. Many businesses, for example, have made important investments relating to Internet technology to support growing electronic businesses such as E-Commerce and other Internet related activities. Since companies are relying on an ever increasing amount of network activity to support their businesses, computing systems generally have become more complex in order to substantially ensure that servers providing network services continue serving the desired network load. Consequently, system reliability is an important aspect to the modern business model.

A first approach for providing powerful and reliable services may be associated with a large multiprocessor system (e.g., mainframe) for managing a server, for example. Since more than one processor may be involved within a large system, services may continue even if one of the plurality of processors fail. Unfortunately, these large systems may be extraordinarily expensive and may be available to only the largest of corporations. A second approach for providing services may involve employing a plurality of lesser expensive systems (e.g., off the shelf PC) individually configured as an array to support the desired load. Although these systems may provide a more economical hardware solution, system management and administration of individual servers may generally be more complex and time consuming than large dedicated systems.

Currently, management of a plurality of servers may be a time intensive and problematic endeavor. For example, managing server content (e.g., software, configuration, data files, components, etc.) generally requires administrators to explicitly distribute (e.g., manually and/or through custom script files) new or updated content and/or configurations (e.g., web server configuration, network settings, etc.) across the servers. If a server's content becomes corrupted, an administrator often has no automatic means of correcting the problem. Furthermore, configuration, load-balance adjusting/load balance tool selection, and system-wide monitoring generally must be achieved via separate applications. Additionally, if one or more servers become disabled (e.g., system crash/failure), administrators often have to manually bring a new server on-line to service the required load. Thus, management of the entity (e.g., plurality of computers acting collectively) as a whole generally requires individual configuration/administration of loosely coupled servers whereby errors and time expended are increased.

Presently, there is not a straightforward and efficient system and/or process for managing, administering, and scaling an application across a collection of independent servers. Many problems are thereby created since administrators may be generally required to work with machines individually to setup/deploy application content/tools and/or monitor/administer each server. Due to the need to administer and modify content on each machine individually, errors are a common occurrence. For example, it is routine for portions of server content to get out of sync with a master copy of the content associated with the collection of servers. Additionally, setting up load-balancing for servers, wherein each server may be given a suitable amount of work, is often a painful and error prone process. For example, load balancing often requires knowledge of intimate details of load-balancing tools which are often difficult and complex to work with.

Still yet another problem associated with management and administration is related to receiving system wide performance results and/or status of the collection of servers. Some applications may exist that provide performance and/or status of an individual server, however, these applications generally do not provide performance or status across the logical collection of loosely coupled servers. For example, many times it is important to view information from the collection of servers to determine relevant system-wide performance. Thus, getting a quick response view of pertinent performance information (e.g., requests/second, members used) associated with the plurality of servers may be problematic, however, since each server generally must be searched independently.

Currently, there is not an efficient and straightforward/consistent architecture for managing and administering an entity without substantial and sometimes complex individual configuration/monitoring of each member associated with the entity. Consequently, there is an unsolved need in the art for a systems architecture to manage, administer, configure and monitor a group of servers operating as an entity in order to scale the system to supply the desired load.

SUMMARY

The present invention relates to a virtual architecture wherein virtual applications may be defined, scaled and managed across and/or within a plurality of members (e.g., servers, computers, processors). The virtual architecture enables a user to flexibly and easily define/identify a desired amount of computer resources to be employed by applications without limiting and/or restricting users to a predetermined configuration to execute and/or manage the virtual application. Applications may thus be scaled and managed over a plurality of systems to achieve desired "virtual" system performance. Furthermore, management of virtual applications may be facilitated by enabling users to monitor performance, receive event/failure notification, and balance the application load across a plurality of computer resources to ease administrative burdens associated with conventional systems and facilitate a desired entity performance level.

Scaling enables applications to be defined that redundantly and/or cooperatively function as an entity even though the application may be spread amongst a plurality of systems. For example, a web server application may be scaled across hundreds or thousands of servers in order to meet demands of high volume Internet activity—yet, enable the system administrator to interact and manage the system as if a singular application. In another context, a server application serving a small business Intranet system may be scaled accordingly across a dozen machines, for example, to accommodate much lower system demands. According to either a larger and/or smaller system context, the user may thus interact and manage the virtual system as if operating with an entity and/or machine associated with a plurality of collective resources to achieve an overall system performance level. Thus, management of disparate computing resources for the virtual system may be greatly facilitated. It is further noted that scaling provides a redundant and robust virtual system of associated computing resources whereby if one of the defined portions of the virtual system fail, the remaining portions may suitably adapt to the system load. Consequently, a service level agreement and/or entity load balancing may be provided in accordance with the present invention to enable a user to determine, configure, and facilitate a desired system performance level.

In accordance with an aspect of the present invention, a topology manager, a virtual applications manager and a replication system may be provided to enable portions of the virtual applications architecture described above. The topology manager provides a framework wherein a controller may determine and synchronize member resources of the entity wherein an application may be loaded and/or reside. For example, the framework may include enabling the controller to manage a plurality of resources relating to the application throughout the entity and/or portions therein. As applications content is added, removed and/or altered within the entity, the controller may facilitate synchronization of the content to the entity by enabling applications defined in the virtual applications manager to be replicated across the entity by the replications system.

The virtual applications manager may provide a manifest to define portions of the application. For example, the manifest may include listings of objects, files, directories, and/or executables informing the controller which resources may be included in the virtual application. The replication system enables applications as defined in the manifest to be scaled and propagated across the entity as directed by the topology manager.

According to another aspect of the present invention, performance management and failure management may be included within the virtual architecture described above. Entity performance may be determined by providing metrics from members of the entity and aggregating the metrics at the controller described above. In this manner, administration and troubleshooting of the entity are facilitated by not requiring users to determine entity performance by monitoring members individually. Failure management may be achieved by the present invention by determining relevant events for the entity and thereby enabling automated actions to occur based on the events. In this manner, the system may automatically notify an administrator and/or follow predetermined rules for enabling the entity to continue to provide a desired service level—even if a member were to fail or malfunction. Load balancing of the entity members may also be provided to facilitate desired service levels. As will be described in more detail below, a service level agreement in accordance with the present invention may be established to facilitate the desired service level and thereby enable continued service to the network load.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION

Figure 1:
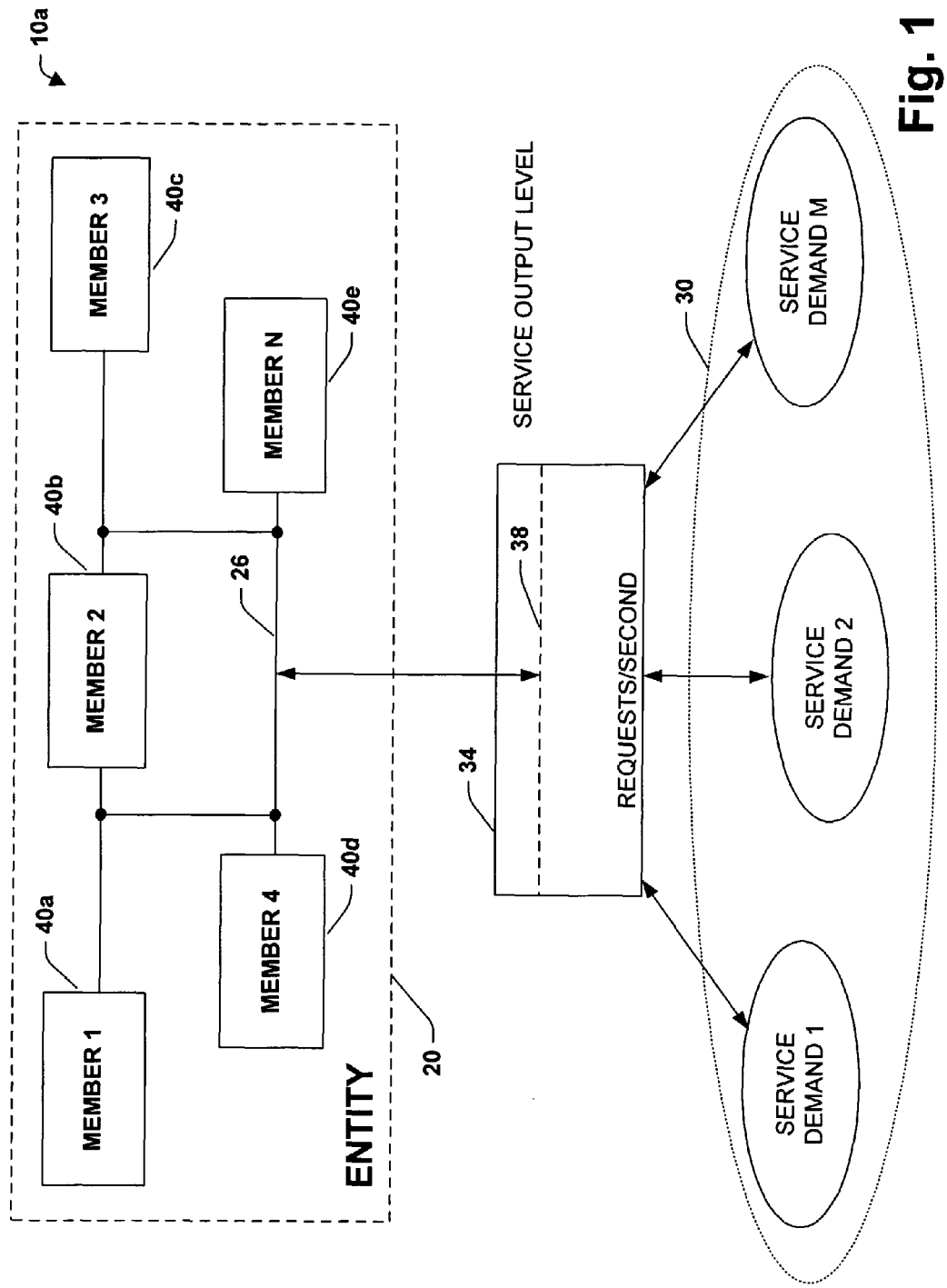
FIG. 1 is a schematic block diagram illustrating an entity for providing network services in accordance with an aspect of the present invention.

The present invention is now described with reference to the drawings, wherein like reference numerals are used to refer to like elements throughout.

The present invention relates to a virtual applications architecture wherein a plurality of members may be scaled, managed, and administered as a cooperative entity. The architecture enables the members to collectively serve high volume network loads such as handling Internet and/or Intranet client Web page requests, for example. In accordance with the present invention, applications may be managed across the entity by a topology manager and a virtual applications manager. This may be achieved for example by having the topology manager control membership throughout the cluster by communicating with a defined set of members and initiating application content updates to the members as needed. A master copy of application content may be included within the virtual applications manager, and members may be updated to the master copy to synchronize members with the topology manager. According to another aspect of the present invention, applications may be distributed throughout the entity via a replication system. Performance and failure management may also be provided to facilitate administrative monitoring, troubleshooting and failure recovery for the entity and/or members. Furthermore, load balancing may be provided to distribute network requests throughout the entity and to further enhance failure recovery if a member crashes and/or fails. A service level agreement within the entity may also be provided to further enhance system performance capabilities.

Referring initially to FIG. 1, an exemplary system 10a illustrates an aspect of a virtual applications architecture in accordance with the present invention. An entity 20, which may be operatively coupled to a network 26, such as the Internet, responds and services incoming service requests from a plurality of demand sources 30. The demand sources 30 may be received world-wide and thus, collectively provide a network load 34 which may be determined, for example, as the number of network requests received per second by the entity 20. As illustrated, a service level 38 may be provided by the entity 20 to supply the demand load (e.g., millions of requests/second) at points in time. As will be described in more detail below, the virtual applications architecture enables the entity 20 to respond/service the load 34 and to facilitate a desired service level 38.

The entity 20 may include a plurality of members 1 through N (N being an integer 1,2, ... ) 40a-40e, hereinafter referred to as the members 40, cooperating to service the load 34. The members 40 may be computer/server systems adapted to communicate to the network 26, for example, and may be scaled by adding and/or removing members to service larger and/or smaller loads 34. For example, the entity 20 may include members 40a through 40e for serving "X" requests/second, and include additional members (not shown) for serving larger loads 34 than X. As will be described in more detail below, members 40 and associated resources may be dynamically added to/removed from the entity 20 via a service level agreement according to dynamic changes in the load 34 and to facilitate a desired service level 38.

Figure 2:
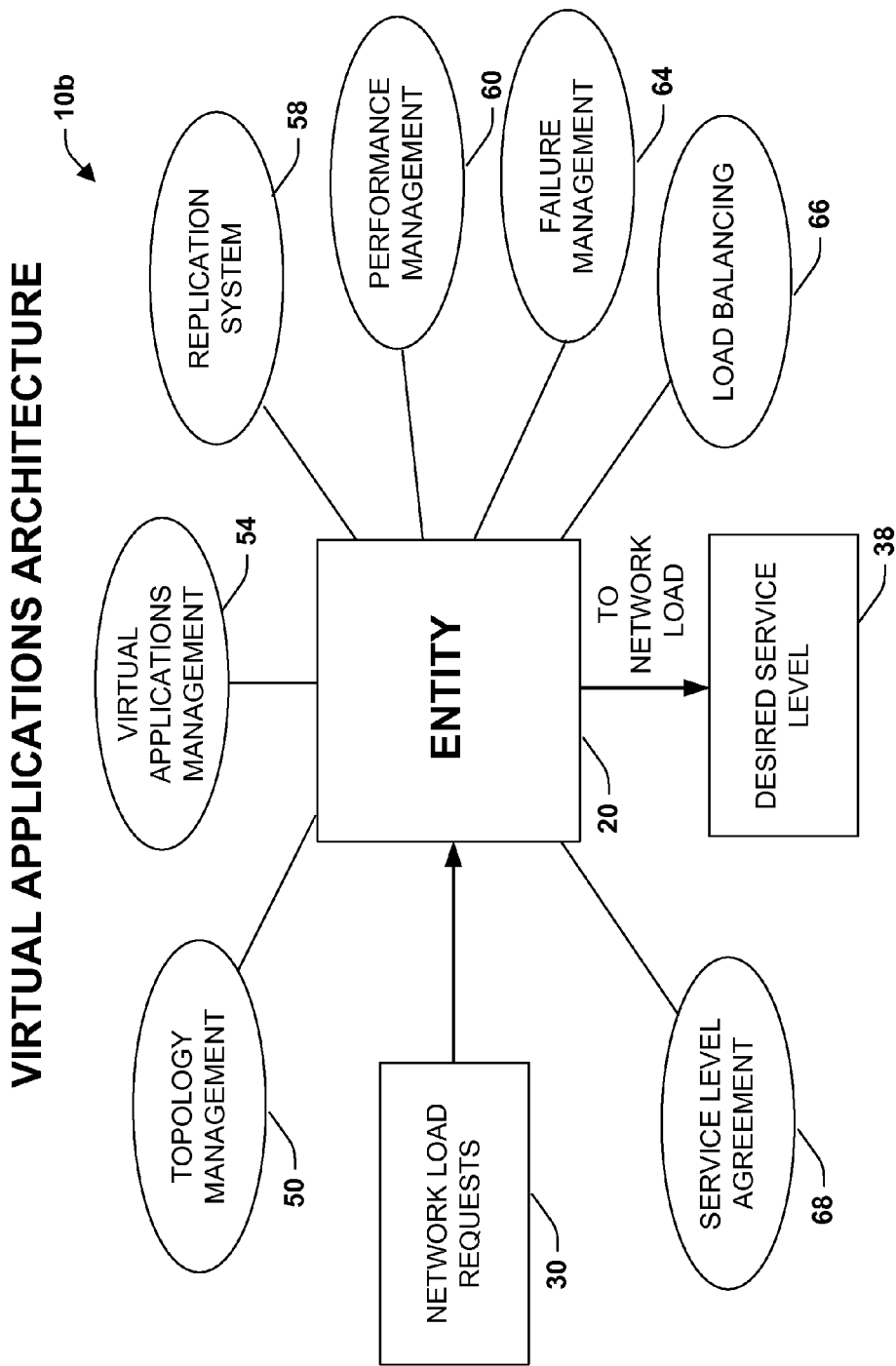
FIG. 2 is a schematic block diagram illustrating a virtual applications architecture in accordance with an aspect of the present invention.

Turning now to FIG. 2, an exemplary system 10b illustrates a virtual applications architecture in accordance with the present invention. The virtual applications architecture enables the entity 20 to receive a plurality of network requests 30 and provide a desired service level 38 based upon the requests 30. The entity 20 may include a topology manager 50, a virtual applications manager 54, a replication system 58, a performance management system 60, a failure management system 64, a load balancing system 66, and a service level agreement 68.

The topology manager 50 facilitates member cooperation and synchronization within the entity 20. This may be achieved, for example, by determining if the members (not shown) are in agreement with the virtual applications manager 54 which contains a master copy of content (e.g., applications, configurations, registry settings, components, executables, DLL's, directories, files, etc.) to service the network requests 30. If the topology manager determines that a member does not agree with the master copy, a content replication may be initiated by enabling the replication system 58 to update the member with suitable content to service desired loads. This may be achieved, for example, by setting a flag to enable the replication system 58. By updating members according to the virtual applications manager 54, synchronization with the topology manager 50 may be achieved. It is noted that the entity 20 may be homogeneously and/or non-homogeneously configured. For example, in a homogenous configuration, replication of similar content may occur to all members within the entity 20. In a non-homogenous configuration, some members may be configured dissimilarly from other members based upon system requirements.

According to another aspect of the present invention, the performance management system 60 may be included to facilitate monitoring and administration of the entity 20. As will be described in more detail below, members may log events related to member performance and provide the logs to a plurality of data stores. From the data stores, performance may then be aggregated to determine performance of the entity 20. In this manner, a determination may be easily made by an administrator whether or not the entity 20 provides the desired service level 38. Moreover, troubleshooting and failure detection are facilitated by aggregating member performance wherein the administrator may rapidly determine from the logs which portion of the entity 20 may be malfunctioning. This is in contrast to conventional systems wherein individual members may have to be searched independently and manually by the administrator thereby expending valuable time and resources.

According to yet another aspect of the present invention, the failure management system 64 may be provided to cause entity 20 actions to occur based upon predetermined rules. For example, a monitor may be set up to receive and measure the events described above. If the number and/or type of event exceeds a predetermined rule (e.g., threshold) for the event, the topology manager 50 may be alarmed to take corrective action. The corrective actions may include for example, notifying an administrator, taking a member out of service, bringing a new member into the entity 20 and a plurality of other actions relating to service and administration of a computer system. In this manner, a desired service level 38 may be maintained.

Relating to failure management, system reliability and redundancy, the load balancing system 66 may be provided to distribute network requests 30 to the members of the entity 20. Load balancing facilitates entity 20 reliability by distributing network requests 30 to contributing members of the entity 20. For example, if member 2 (Ref. 40b in FIG. 1), were to fail, the load balancing system 66 may distribute the network requests previously being routed to member (2) to other members in the entity 20. In this manner, the desired service level 38 may also be maintained and system reliability increased.

According to yet another aspect of the present invention, the service level agreement 68 may also be provided to facilitate entity 20 performance and/or vary the desired service level 38. The service level agreement 68 may provide rules for the topology manager 50 to determine and adjust the service level 38. For example, some of the entity members may be enabled at certain times of day (e.g., via a timer within the topology manager) — if so desired. This may be advantageous for example during peak Internet activity periods in a day. Another rule may cause the topology manager 50 to enable/disable members based upon the amount of network requests 30. Still yet another rule may enable members to participate based upon the origin of the requests 30. For example, member 4 shown in FIG. 1, may become enabled during requests originating from Europe and/or Japan. It is to be appreciated that a plurality of other rules may be developed for adjusting the desired service level 38.

Figure 3:
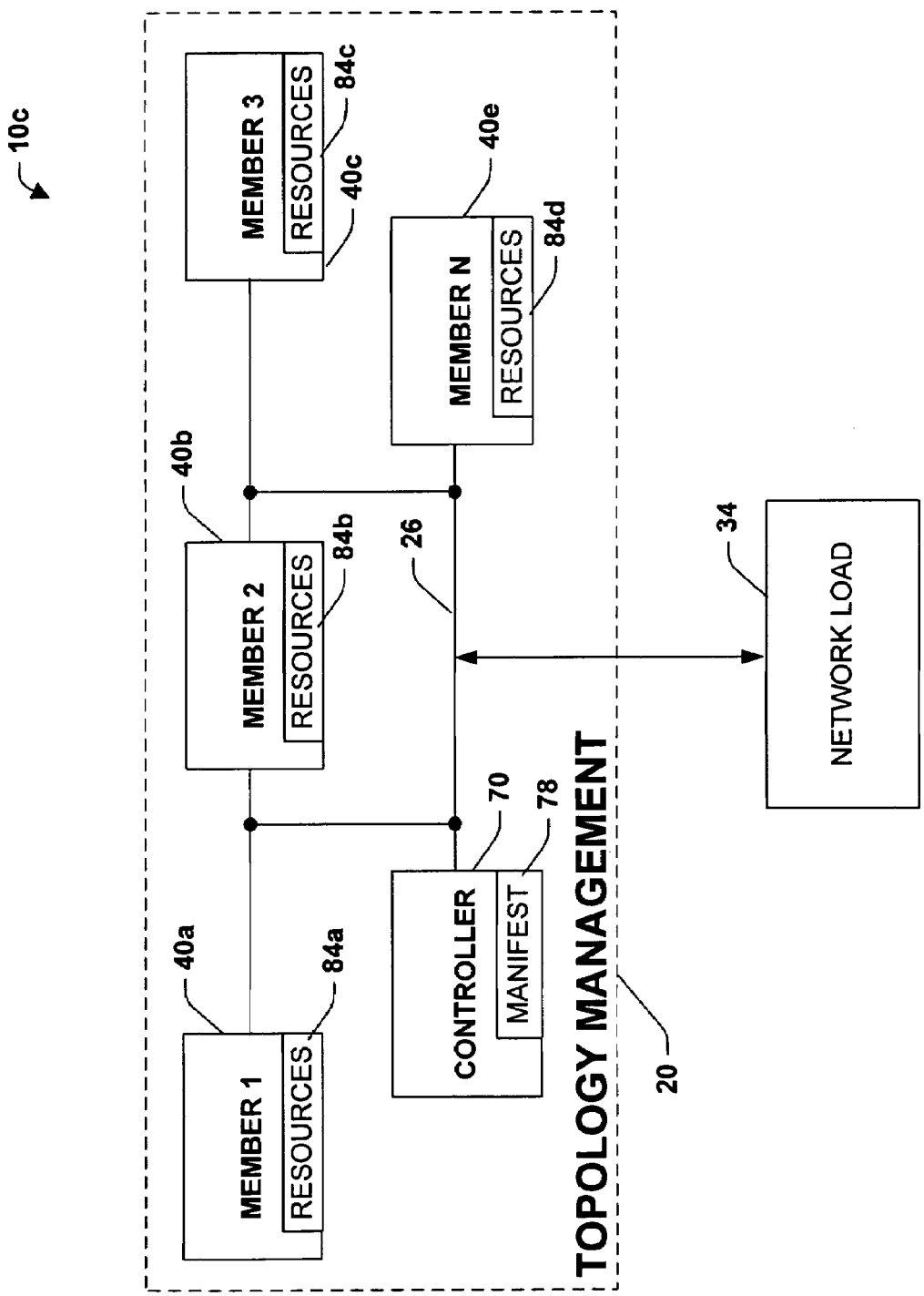
FIG. 3 is a schematic block diagram illustrating topology and virtual applications management in accordance with one aspect of the present invention.

Referring now to FIG. 3, an exemplary system 10c illustrates a topology and virtual applications management system. According to an aspect of the present invention, a controller 70 may be designated (e.g., selected by an administrator, elected by entity rules—described below) to provide topology management wherein applications may be managed and scaled across the entity 20 to service a network load 34. Virtual applications management may be provided by a manifest 78 within the controller 70, for example. The manifest 78 which may be maintained in a storage (not shown), such as a database, and may include resources 84 (illustrated as Ref. 84a through 84d) defining the applications designated for deployment throughout the entity 20. As will be described in more detail below, the resources 84 may be deployed by a replication system (not shown) in order to automatically configure each member to service the network load 34. Thus, individual manual configuration and applications deployment as associated with conventional systems is substantially improved by the present invention.

The resources 84 defined in the manifest 78 may include the desired resources to enable a Web site and/or distributed component (e.g., COM+) application, for example, to function on a member 40. An exemplary set of applications resources may include Web site applications with associated directory names and paths relating to the application. Associated registry settings for configuring members to run the applications may also be included. Other resources may include files, folders, and/or other associated directories for enabling an application to be deployed and execute on a member. It is to be appreciated that other data and executables as are well understood may also be included in the manifest 78.

After an application has been defined in the manifest 78 and deployed to the members 40, the entity 20 may begin to service requests from the network load 34. The controller 70 may periodically communicate with the members 40 to determine if the deployed resources 84 correlate to the resources defined in the manifest 78. In this manner application content associated with the members may be synchronized with the controller 70. For example, if a new member has been added to the entity 20, the controller 70 may manage the new entity topology by determining which resources in the new member do not match those defined in the manifest 78. This may achieved, for example, by providing a list of associated resources (described below) from the controller 70 to the member 40, having the member request resources appearing on the list which the member does not have, and deploying resources from the controller 70 to the requesting member.

Although topology management has been described in terms of a singular controller 70, it is to be appreciated that alternative topology management schemes may be selected for the entity 20. For example, each member 40 associated with the entity 20 may contain a manifest for defining an application. If a user/administrator were to update any member with new applications content, the new content may be deployed from that members manifest to other members of the entity 20 during a designated update period, for example (e.g., setting a flag alerting all members to receive new content). Synchronization of application content may be alternatively achieved, for example, by employing a voting arrangement during non-update periods (e.g., flag described above is reset) wherein each member publishes a list of what is believed to be the correct applications content. For example, if eight of nine members agree on the content, then minority voting members may be updated from any majority voting member.

Referring back to the singular controller 70 of FIG. 3, the controller 70 generally provides the authoritative copy of content and configuration information for the entity 20. Members may be kept synchronized with the controller 70, both in terms of entity-related configuration and content. Entity-wide changes (either configuration and/or content), therefore, should be applied through the controller 70, and generally should not be applied while the controller 70 is unavailable (e.g., failed).

Relating to system reliability and management, administrators may select whether a controller failure should be handled "transparently" (e.g., automatic controller failover) or whether administrative action is required to handle the failure. In some cases, for example when the entity 20 is in "steady state" wherein there are few changes in content and/ or configuration, the administrator may choose to have the controller fail over transparently because losses/changes in configuration may be easily rectified. In other cases, such as before a large deployment of new content, the administrator may turn automatic controller failover off (e.g., set flag) during the course of the deployment, in order that new content may not be overwritten by content from the new controller if the current controller fails.

If controller failover is on, when the controller 70 fails, a new controller may be selected from the members 40. An ordered list of members (e.g., a controller failover hierarchy) may be provided to members that specifies in which order the members become controller, for example. The list may include "A, B, C, D" and may imply that if member A fails, member B becomes the controller. If both A and B fail, C becomes the controller and so forth. This enables the election protocol for selecting a new controller to be straightforward. For example, after members have a consistent list of which members belong to the entity 20 (e.g., after a failure), the member that appears first in the failover hierarchy may become the controller. It is to be appreciated that other election protocols may be defined.

Figure 4:
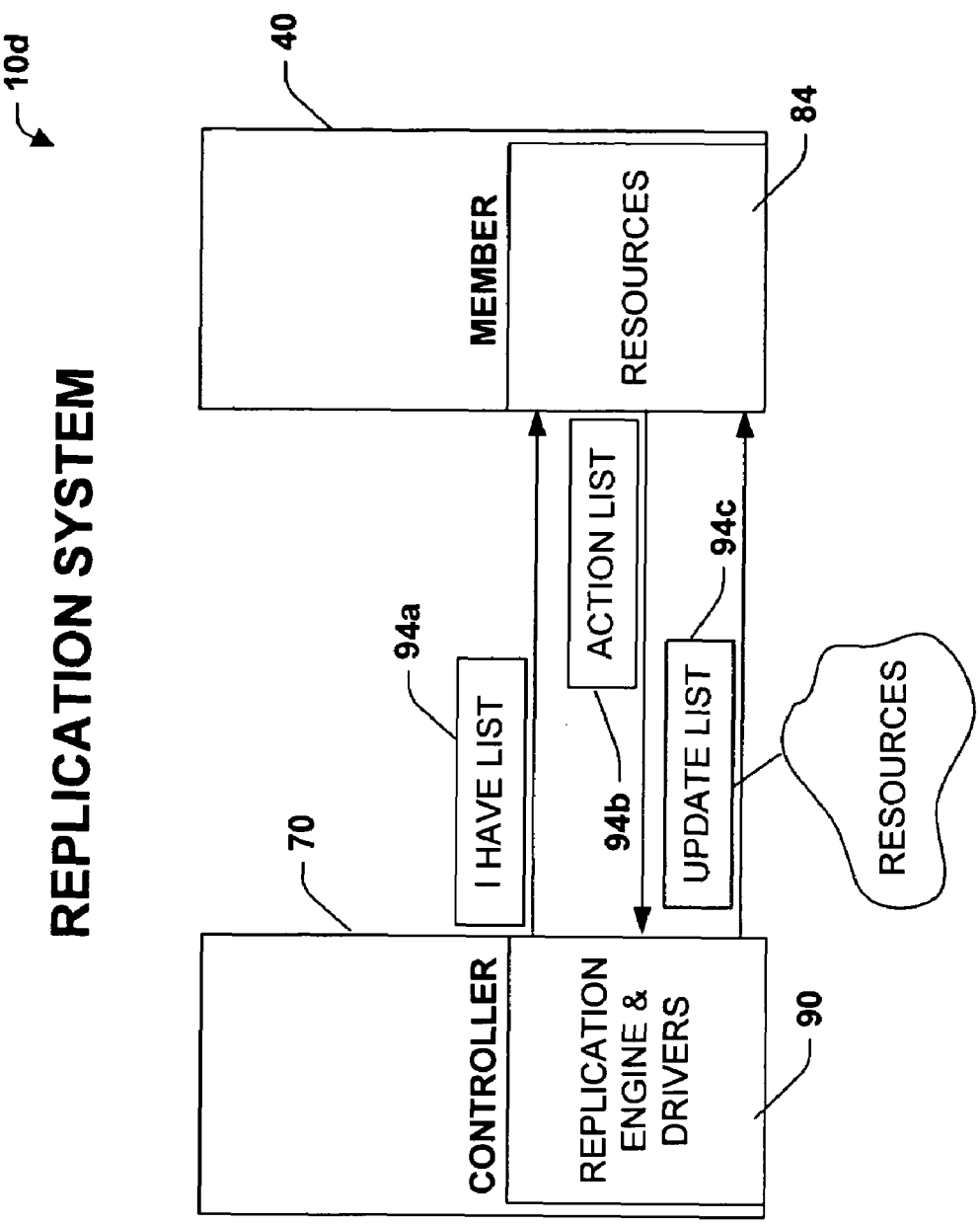
FIG. 4 is a schematic block diagram illustrating a replication system in accordance with an aspect of the present invention.

Referring now to FIG. 4, an exemplary system 10d illustrates a replication system in accordance with an aspect of the present invention. Although replication is depicted between the controller 70 and a single member 40, it is to be appreciated that the controller may replicate applications to all members of the entity. A two level architecture 90 may be provided including a Replication Engine and Replication Drivers to propagate virtual applications to/from entity members 40. For example, there may be a replication driver for each content type (e.g., Files, Metabase settings, COM+ components, CAPI items, and registry settings (DSNs), etc.). The drivers may be responsible for reading and writing content type, wherein the replication engine may be responsible for coordinating replications among drivers, error recovery, and transport. Lists 94a-94d (e.g., XML) may be provided to facilitate communications and replication to the members 40. For example, the lists 94 may include: an IHaveList (e.g., signature list) 94a, an ActionList (e.g., request for updated content) 94b, and an UpdateList (e.g., updated content—may contain pointers to external storage instead of actual content).

The replication system 10d may operate in a plurality of modes to propagate changes throughout the entity. For example, an Automatic mode may be provided which enables updates to occur when new content has been provided to the controller 70. Also, there may be a Full Synch mode, which may run a content check of resource items against members to facilitate fidelity of member content. The Full Synch may be started manually (e.g., set flag) by the user and may also run periodically to facilitate that the members are in synchronization. During an automatic update, a full synchronization may also occur to facilitate fidelity of content. When a Full Synch occurs, the Replication Engine may call the drivers and command the drivers to search a namespace (not shown) (e.g., files and directories specified for the application, the metabase, user specified DSNs, etc.) on the controller 70 and compare the namespace with each member. The differences between the controller 70 and individual members 40 may then be sent to the member and applied.

According to an alternative aspect of the present invention, drivers may keep a last synchronized token. When a full synch occurs, a determination may be made against the token to see if the member is already in synch. If so, then replication may abort. If the token is out of date, then a full synchronization may proceed for that driver. This provides for optimization of network traffic by mitigating comparisons if content is already in synch.

When changes are made to the controller 70 and automatic replication is enabled as described above, the replication system 10d may detect the change and replicate it. For example, the replication engine may listen to notifications from the replication drivers for changes. When a change is detected, these changes may be sent to the members in the entity, then applied via the Lists 94 described above, for example.

During a Full Synch replication, the IHaveList 94a may be sent to the member 40 from the controller 70. The member may then check its own content and reply with the ActionList 94b that requests the changes needed. The controller 70d may then respond with UpdateList 94c providing the information requested for that update. During an Automatic replication, the Replication Engine may send UpdateLists 94c to the target members informing them of changes as they occur on the controller 70. For example, The UpdateList 94c may be an XML blob that describes what the update is, what data is being updated, and the actual update — if desired. There may be an ACTION parameter (not shown) that describes how the updated item should be handled during automatic updates. For example, the parameter's value may be SET to update and/or change an existing item, DEL to delete an existing item, and/or ADD to create a new item.

Figure 5:
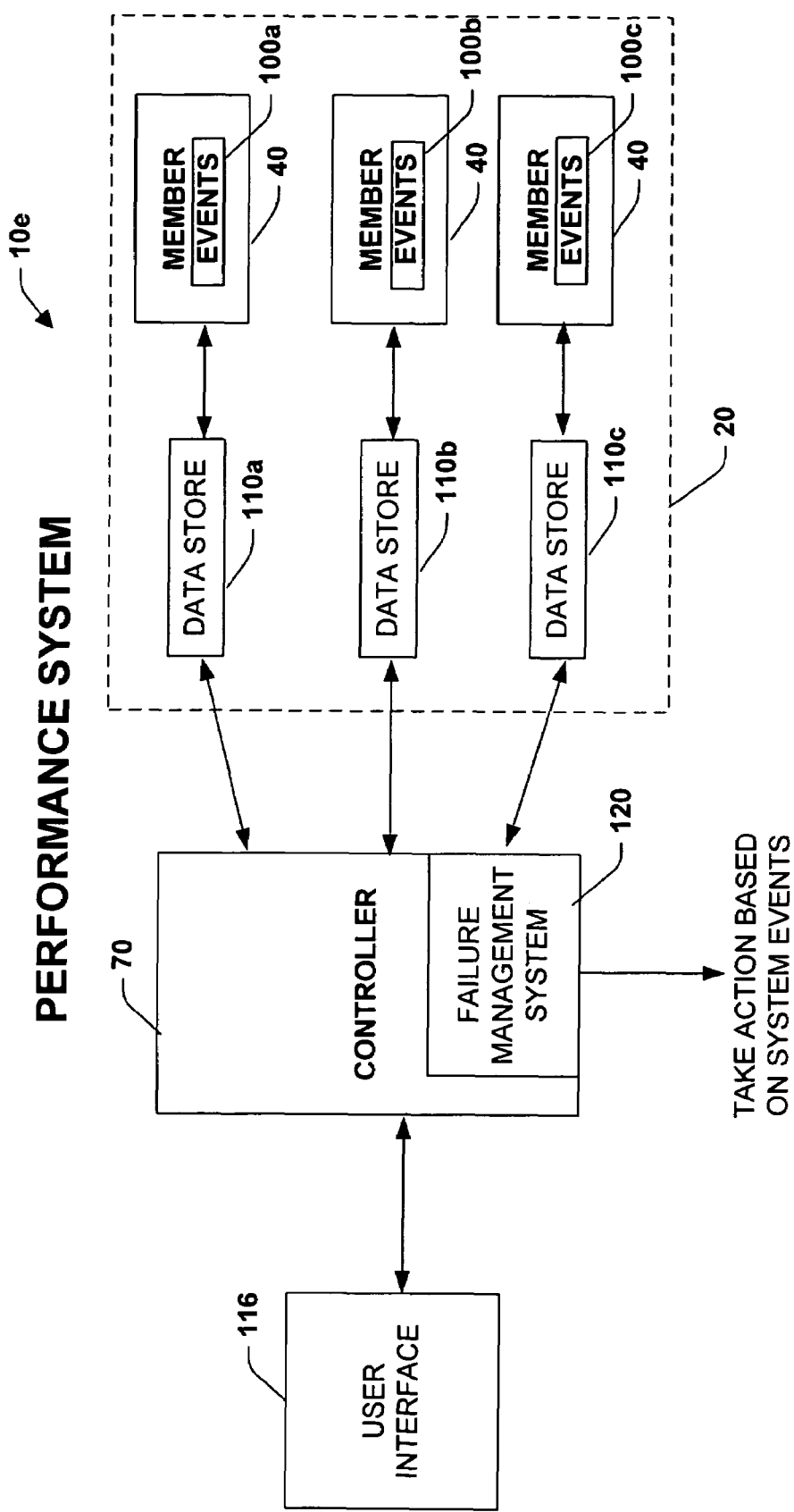
FIG. 5 is a schematic block diagram illustrating a performance and failure management system in accordance with an aspect of the present invention.

Referring now to FIG. 5, an exemplary system 10e illustrates performance and failure management in accordance with an aspect of the present invention. Performance management may be facilitated by providing instrumentation on members 40 and then aggregating the results of the instrumentation to determine entity 20 performance. For example, this may include enabling events associated with each member, as described below, to determine related metrics, and then aggregating the events to determine collective performance of the members. Thus, individual monitoring of members as associated with conventional systems is mitigated. Aggregation of metrics also facilitates system administration since the metrics may be observed across the entity from a single console. Additionally, failure management may be provided by enabling automated actions based upon entity and member events thereby facilitating entity reliability.

As illustrated in FIG. 5, performance and failure management may be enabled by generating events 100 for the members 40, logging the events, and monitoring the events either from an entity 20 view and/or from a member 40 view. Events are generally data points reflecting member 40 activity and may be logged into data stores 110a-110c for each member. The controller 70 may then query the data stores 110, and aggregate the information by performing statistical analysis (e.g., summing, averaging, RMS, etc. on the member data). For example, Windows Management Infrastructure developed by Microsoft provides an infrastructure to discover information about the system 10e and "subscribe" to various event sources (not shown). The event sources may include entity events such as related to replication of files to members, Windows events such as related to members, monitors (e.g., Microsoft Health Monitor) such as related to resources such as disk and CPU utilization, and related performance counters (e.g., Microsoft PerfMon).

As an example of aggregation, the controller 70 may acquire events from the data stores 110 (e.g., CPU utilization) and perform an average of the member data relating to CPU utilization and thus provide an average entity CPU utilization to a user interface 116. Thus, entity administration and troubleshooting is improved over conventional systems by enabling users to administer and monitor entity performance as opposed to individual members. It is to be appreciated that events 100 may also be characterized as general purpose interrupts that may be triggered at the occurrence of a predetermined condition. Thus, it is understood that a UNIX and/or other operating system may be similarly configured, for example.

Failure management may be facilitated by including a failure management system 116 (e.g., Windows Health Monitor) which provides the ability to monitor event sources such as system resources (disk, CPU), applications services, performance counters, set rules on the sources (e.g., CPU>90% for 2 minutes), and take actions when the rule thresholds are triggered. For example, if the above example rule "CPU>90% for 2 minutes" were exceeded, an administrator may be notified via an e-mail notice and/or a script file may be generated. Rules provide a system to define characteristics that determine whether a member/entity is healthy (status = ok), whether problems may occur soon (status=warning), and/or whether there is a problem (status = critical), for example.

Figure 6:
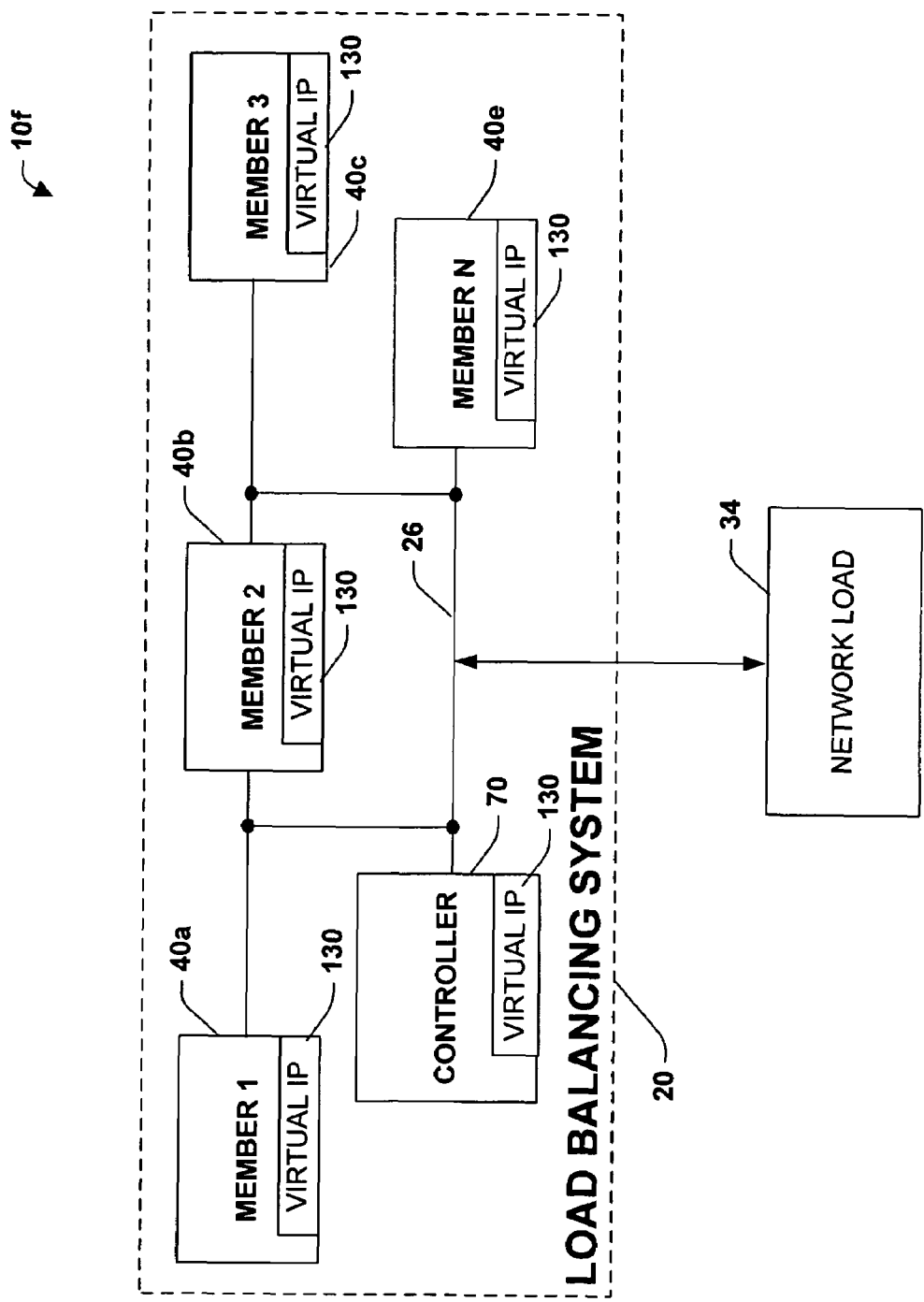
FIG. 6 is a schematic block diagram illustrating a load balancing system in accordance with an aspect of the present invention.

Turning to FIG. 6, an exemplary system 10f illustrates load balancing in accordance with the present invention. Load balancing may be achieved, for example, by providing a load balancing system 130 (e.g., Microsoft Network Load Balancing) with members of the entity 20. It is to be appreciated that a plurality of commercially available load balancing systems 130 may be selected. For example, if Network Load Balancing were selected, members 40 may observe requests associated with a "Virtual IP Address" wherein clients generate requests to the virtual IP and load balancing rules may then be applied to process the requests. The member 40 that processes a particular request depends in part to the load balancing rules that may be in effect. By providing load balancing, requests from the network load 34 may be distributed across the entity in a manner proportional to the members 40 capacity. Additionally, reliability of the entity 20 may be increased wherein if a member 40 fails, load balancing may thus enable requests to be distributed to remaining members.

Figure 7:
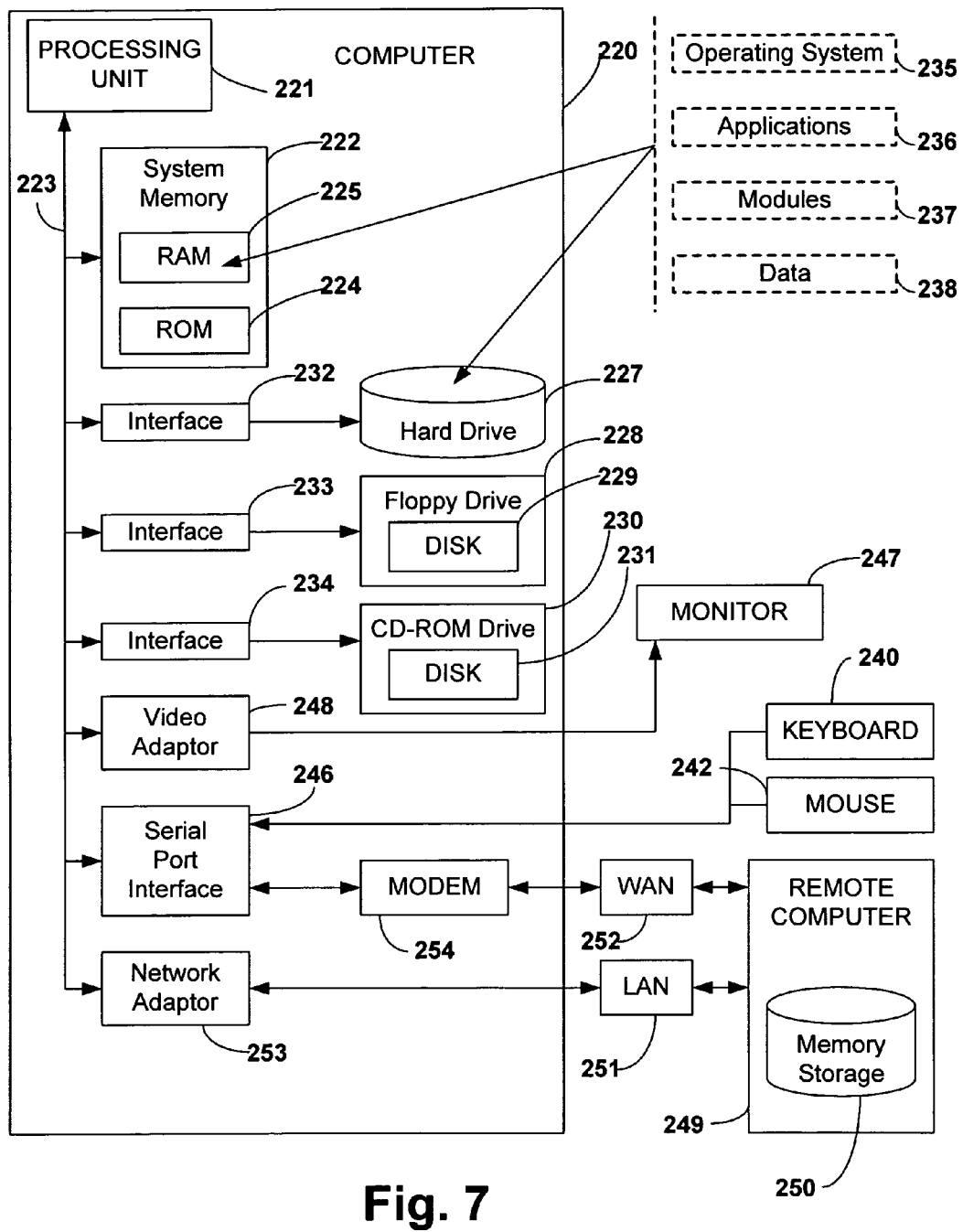
FIG. 7 is a schematic block diagram illustrating a system in accordance with one aspect of the present invention.

In order to provide a context for the various aspects of the invention, FIG. 7 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 7, an exemplary system for implementing the various aspects of the invention includes a conventional computer 220, including a processing unit 221, a system memory 222, and a system bus 223 that couples various system components including the system memory to the processing unit 221. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also may be employed as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the server computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be a Microsoft operating system (e.g., Windows NT operating system). It is to be appreciated that other operating systems may be employed such as UNIX, for example.

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote client computer 249. The remote computer 249 may be a workstation, a server computer, a router, a peer device or other common network node, and typically includes many or all of the elements described relative to the server computer 220, although only a memory storage device 250 is illustrated in FIG. 7. The logical connections depicted in FIG. 7 include a local area network (LAN) 251 and a wide area network (WAN) 252. Such networking environments are commonplace in offices, enterprise-wide computer networks, intranets and the Internet.

When employed in a LAN networking environment, the server computer 220 may be connected to the local network 251 through a network interface or adapter 253. When utilized in a WAN networking environment, the server computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

Figure 8A:
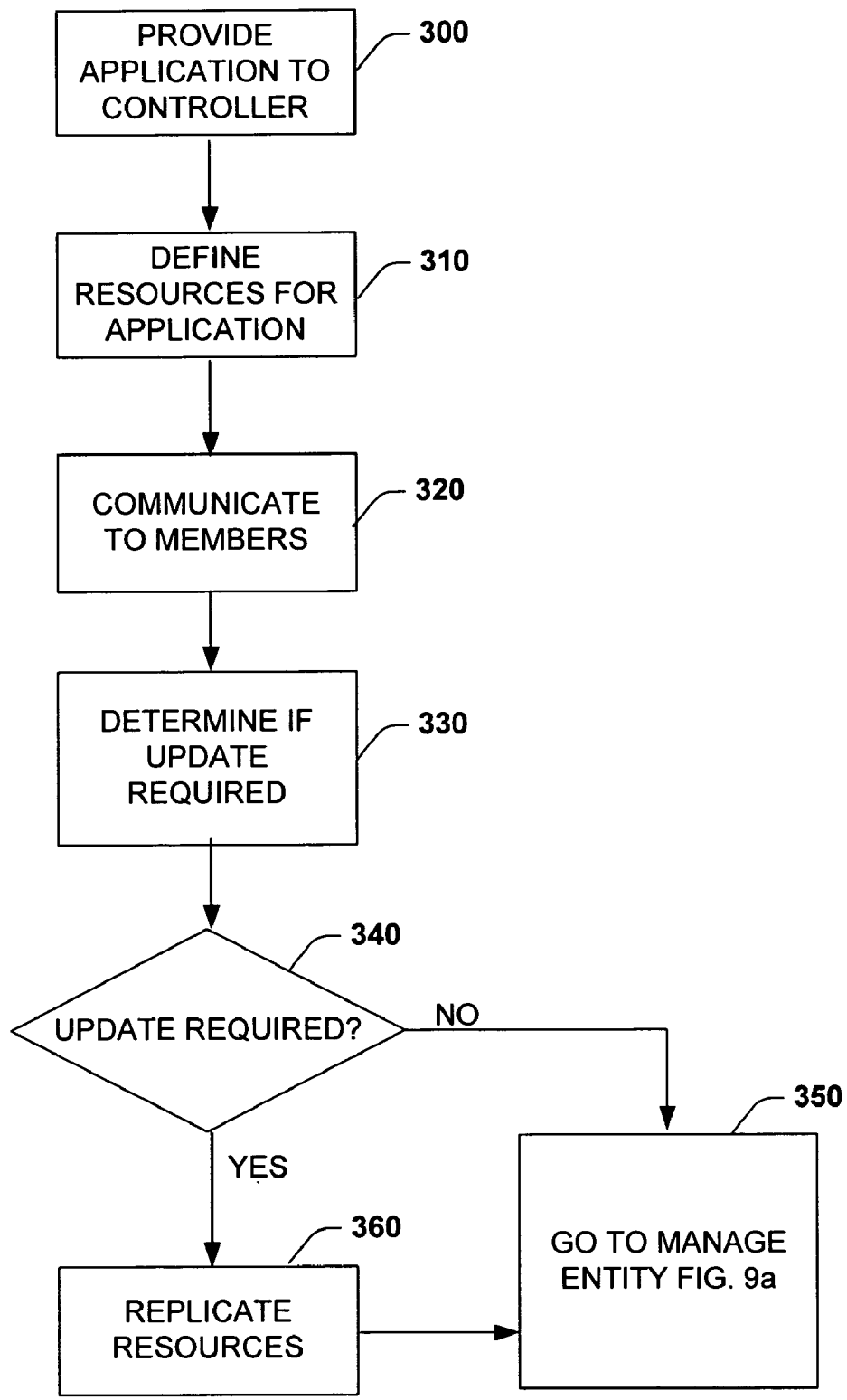
FIGS. 8a and 8b are flow chart diagrams illustrating a methodology for providing a virtual applications architecture in accordance with an aspect of the present invention.

Referring now to FIG. 8a, a flow diagram illustrates a methodology for providing a virtual applications architecture in accordance with an aspect of the present invention. The methodology is described in terms of the entity 20, members 40, and controller 70 depicted in FIGS. 1 through 6. At step 300, an application is provided to the controller such as for delivering Internet Web services, for example. The application may be provided by an administrator and/or automatically downloaded from another system to the controller, for example. At step 310, portions of the application are defined by the controller. For example, the definitions may include pointers, executable, files, directories, and/or components associated with the application. At step 320, the controller communicates with the members of the entity and determines if the members have received a copy of the application at step 330. Proceeding to step 340, if the member has been updated with a copy of the application as determined in step 330, the process proceeds to step 350 to go and manage the entity. If the member has not been updated at step 340, the application is replicated by the controller to the member at step 360 and the process proceeds to step 350.

Figure 8B:
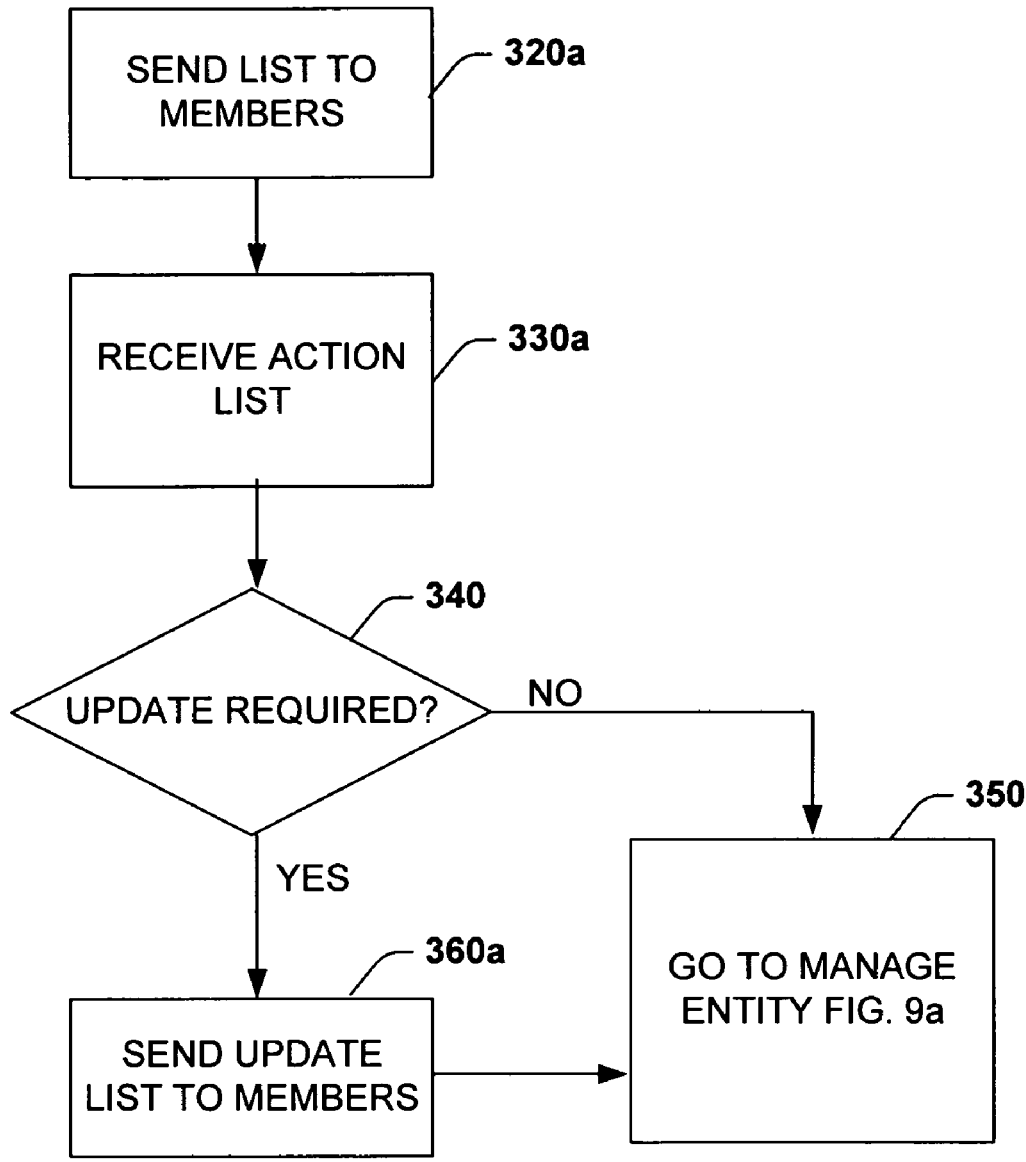

Referring now to FIG. 8b, a flow diagram illustrates a methodology for providing one particular aspect of steps 320 through 360 as depicted in FIG. 8a. At step 320a, a list including applications resident on the controller is transmitted to the members of the entity. At step 330a, the members of the entity determine if applications stored on the members correlate to applications appearing on the list and transmit an action list defining requested items. At step 340, if no items are requested on the action list, the process proceeds to step 350 to go and manage the entity. If items appear on the action list at step 340, an update list may be transmitted by the controller at step 360a in order to replicate the application on the requesting member and the process proceeds to step 350.

Figure 9A:
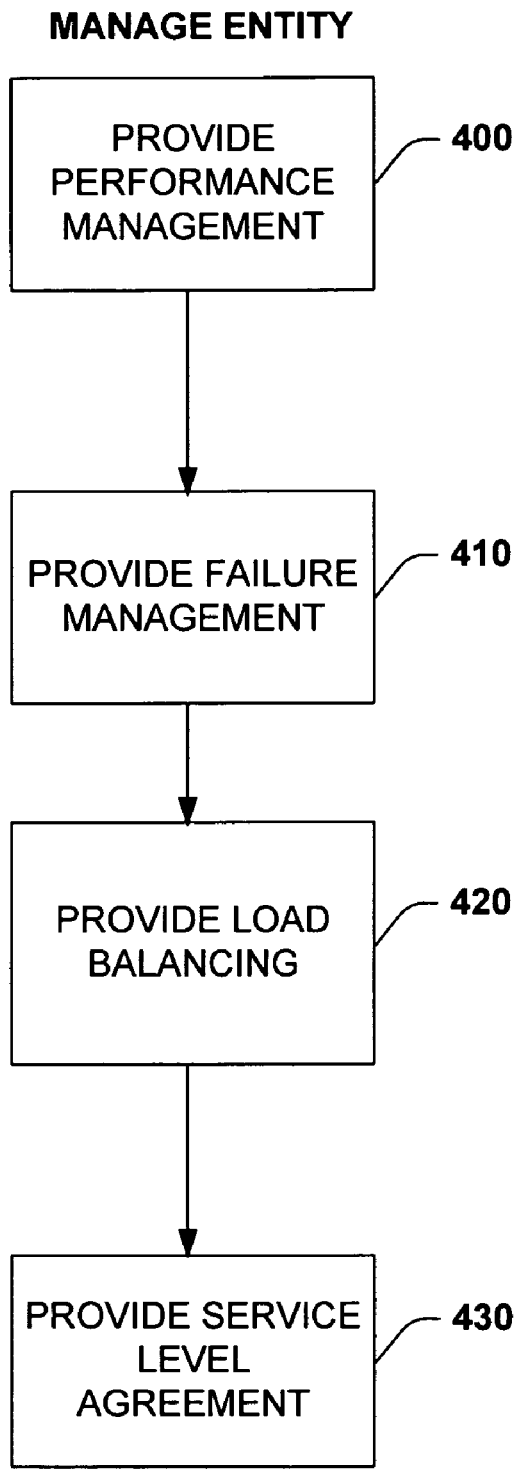
FIGS. 9a-9e are flow chart diagrams illustrating a methodology for managing an entity in accordance with an aspect of the present invention.

Turning to FIG. 9a, a flow diagram illustrates a methodology for managing and administering an entity in accordance with the present invention. At step 400, performance management is provided to the entity for facilitating entity monitoring, troubleshooting and administration. As will be described in more detail below in relation to FIG. 9b, entity performance may be determined by aggregating member information, for example. At step 410, failure management is provided to the entity to enable automated actions to occur based upon rule thresholds associated with system health monitors. At step 420, load balancing is provided to the entity to facilitate member request distribution and to increase entity reliability. At step 430, a service level agreement may be provided to enable entity performance to be automatically adjusted.

Figure 9B:
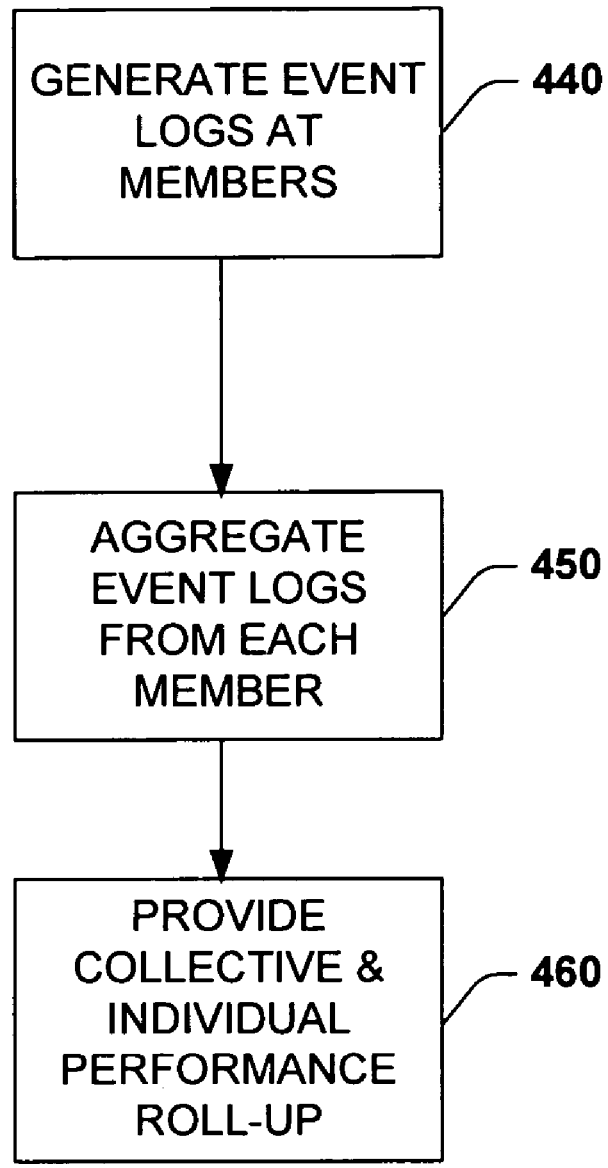

Referring now to FIG. 9b, a flow diagram illustrates a methodology for providing one particular aspect of performance management as depicted in step 400 of FIG. 9a. At step 440, members of the entity generate event logs as described above. At step 450, the event logs from the members are aggregated by the controller to provide entity wide status and performance. As described above, the aggregation may involve statistical roll-ups of the member events. At step 460, both aggregated and individual performance roll-ups are provided to a user interface to enable a system administrator to determine the health of the entity and/or to troubleshoot members if necessary.

Figure 9C:
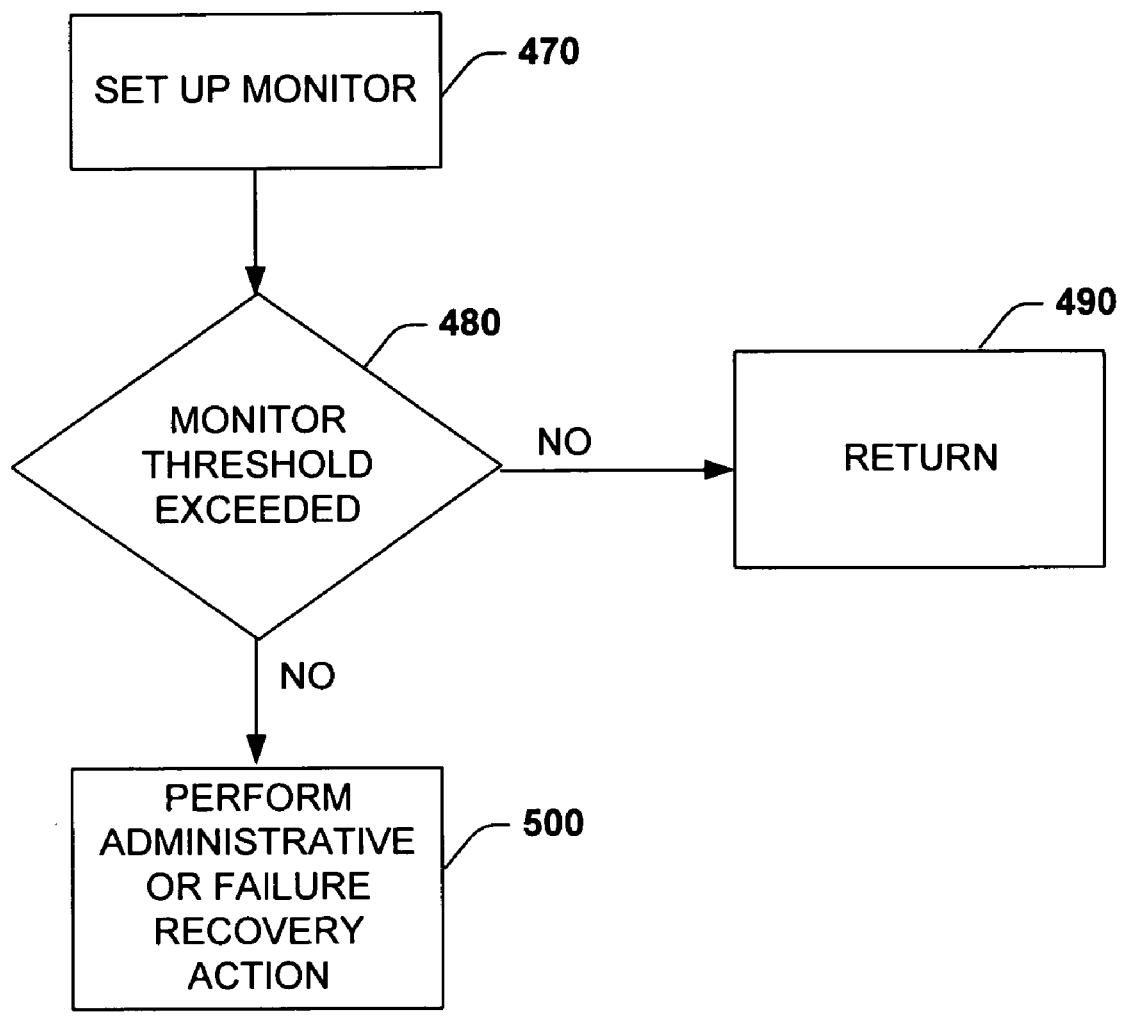

Referring to FIG. 9c, a flow diagram illustrates a methodology for providing one particular aspect of failure management as depicted in step 410 of FIG. 9a. At step 470, a system health monitor is set up by defining a threshold for a system event. For example, the monitor threshold may be set to signal an alarm if the aggregated entity disk capacity falls below 50%. If the monitor threshold is not exceeded at step 480, the process proceeds back to FIG. 9a to continue entity management. If the monitor threshold is exceed at step 480, the process proceeds to step 500 and performs an automated administrative and/or failure recovery action. For example, an administrative action may include sending the administrator an e-mail alerting of the condition. A failure recovery may include taking a member out of service and/or enabling other members to become part of the entity.

Figure 9D:
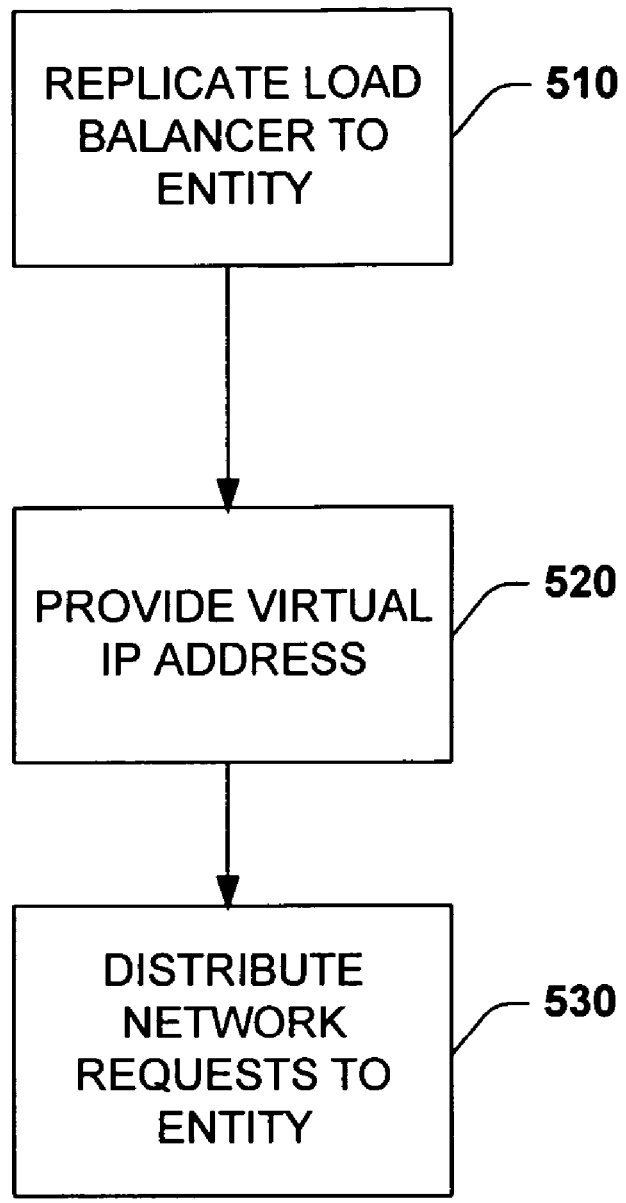

Referring now to FIG. 9d, a flow diagram illustrates a methodology for providing one particular aspect of load balancing as depicted in step 420 of FIG. 9a. At step 510, load balancing systems are replicated throughout the entity. At step 520, the members of the entity are provided with a virtual IP address in order that requests may be distributed throughout the entity at step 530. In this manner, entity performance and reliability may be enhanced by enabling remaining members to share the network load if a particular member happens to fail.

Figure 9E:
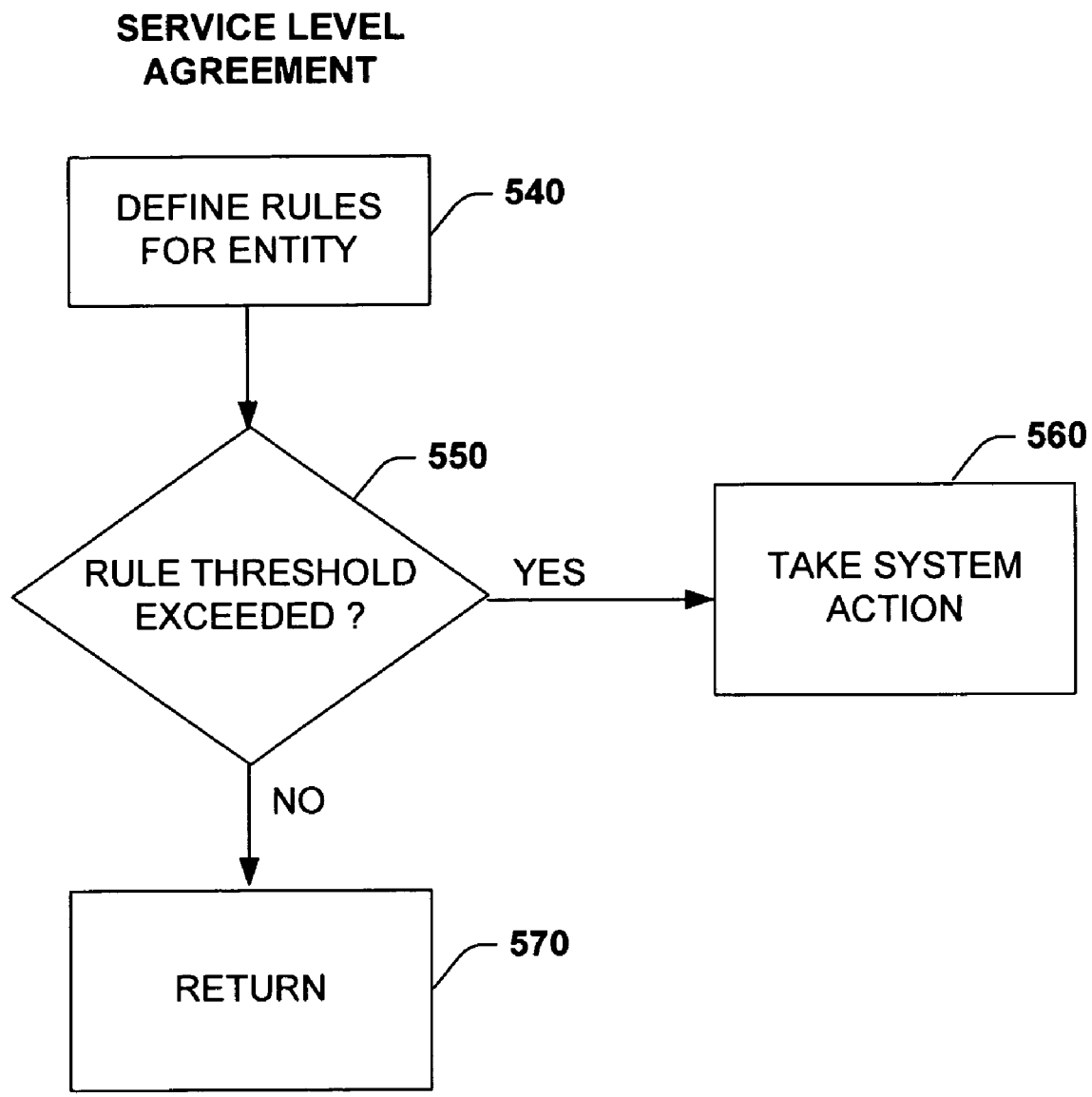

Referring to FIG. 9e, a flow diagram illustrates a methodology for providing one particular aspect of a service level agreement as depicted in step 440 of FIG. 9a. At step 540 system rules may be defined. These rules may be provided at the controller and/or at members of the entity. The rules describe conditions for the controller and/or members to change performance levels of the entity. For example, entity members may be put in or taken out of service based upon whether a rule threshold has been exceeded. For example, rule thresholds may be determined from time, origin of requests (e.g., Mexico, Canada), and/or based upon the frequency of requests. For example, a rule may be adapted at the controller to enable a member to begin servicing requests at 6:00 PM eastern time when many persons may be attempting to access a particular service. At step 550, a determination is made as to whether the rule threshold has been exceed. If the rule threshold has been exceeded at step 550, a system action may be performed for adjusting the desired service level at step 560. If the rule threshold has not been exceeded at step 550, the process proceeds back to FIG. 9a and continues to manage the entity.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that manages a plurality of members, comprising:
    a memory;
    at least one processor;
    a virtual applications manager that defines a plurality of resources required to execute at least one application, resources including at least data, registry settings, and executables required to deploy and execute the at least one application on a member computer;
    a topology manager that manages the plurality of resources by scaling and propagating the plurality of resources across the plurality of members such that the at least one application runs on the plurality of members, scaling dynamically enables and disables members currently running the application as a function of a current demand load on the application, the topology manager providing a view of overall system performance based on an aggregation of individual member performances, aggregation including at least averaging the CPU utilizations of the individual members to provide an overall CPU utilization, wherein the topology manager determines when one or more deployed resources do not correlate with the plurality of resources defined by the virtual applications manager, and synchronizes the plurality of members with the defined resources when a disagreement is discovered;

a means for sending a first list to the plurality of members indicating the plurality of resources currently defined in the manifest;

a means for receiving an action list from the plurality of members indicating updates required to effect correlation between the deployed resources and the resources defined in the manifest, the required updates determined based on a comparison of the deployed resources with the first list; and a means for sending an update list to the plurality of members providing the required updates indicated in the action list.

2. The system of claim 1, wherein aggregation further includes calculating an aggregated disk capacity of the plurality of members.

3. The system of claim 1, the at least one application managed by monitoring the overall performance based on the aggregate of individual member performances.

4. The system of claim 3, the performance monitored by at least one of an entity view that monitors the plurality of members as though a single entity or a member view that monitors an individual member.

5. The system of claim 1, the application managed by balancing an application load across a plurality of computer resources.

6. The system of claim 3, the application managed by monitoring event sources related to the application and generating an event notification when an event source satisfies a defined event rule, the monitoring is performed on the aggregate of individual member performances.

7. The system of claim 1, the resources are scaled and propagated at least one of automatically when new application content is added, manually, or periodically.

8. A computer-readable storage medium storing computer-executable instructions that, when executed on one or more processors, implements a virtual applications architecture, comprising:

means for managing applications across a plurality of member computing devices by scaling and miming the applications across the plurality of members, scaling facilitating dynamic addition and removal of members as a function of current load on the applications;

means for defining a plurality of resources comprising the applications in a manifest associated with the applications, the resources including at least data, registry settings, and executables required to run the applications on a member computing device;

means for deploying the plurality of resources to the plurality of members to facilitate running the applications across the plurality of members;

means for communicating with the plurality of members to determine whether the applications have been deployed to the members;

means for providing a view of overall system performance based on an aggregation of individual member performances with respect to the application, aggregation including at least averaging the CPU utilizations of the individual members to provide an overall CPU utilization and determining an aggregated disk capacity of the members taken as a whole;

means for monitoring overall performance of the application based on the aggregate of individual member performances;

means for applying at least one rule threshold against the aggregate of individual member performances;

means for providing at least one of performance management or failure management given the overall performance and the rule threshold;

a means for sending a first list to the plurality of members indicating the plurality of resources currently defined in the manifest;

a means for receiving an action list from the plurality of members indicating updates required to effect correlation between the deployed resources and the resources defined in the manifest, the required updates determined based on a comparison of the deployed resources with the first list; and a means for sending an update list to the plurality of members providing the required updates indicated in the action list.

9. The computer-readable storage medium of claim 8, wherein the implemented virtual applications architecture further comprises:

means for automatically replicating applications to the plurality of members when deployed resources on a member do not to correlate with the plurality of resources defined in the manifest.

10. The computer-readable storage medium of claim 8 further comprising:

means for providing load balancing between the members.

11. The computer-readable storage medium of claim 8 further comprising:

means for providing a service level agreement among the plurality of members that facilitates automatic disabling and enabling of members based on the time of day.

12. A computer-implemented method for providing a virtual applications architecture, comprising:

managing applications across a plurality of member computing devices by scaling the applications across the plurality of members, scaling facilitating dynamic addition and removal of members running the application as a function of current demand load on the applications;

defining a plurality of resources comprising the applications in a manifest associated with the applications, the plurality of resources including at least data, registry settings, and executables required to deploy and execute the at least one application on a member computing device;

deploying the plurality of resources to the plurality of members to facilitate running the applications across the plurality of members;

communicating with the plurality of members to determine whether the applications have been deployed to the members;

synchronizing the members with the resources defined in the manifest when at least one member is determined to disagree with the defined resources;

dynamically viewing and managing a subset of the deployed resources as one entity and as individual resources, the subset comprising at least two of the plurality of resources;

monitoring overall performance of the applications based on an aggregate of individual member performances, the aggregate including at least an average CPU utilization of the individual members; and providing performance management given the overall performance;

sending a first list to the plurality of members indicating the plurality of resources currently defined in the manifest;

receiving an action list from the plurality of members indicating updates required to effect correlation between the deployed resources and the resources defined in the manifest, the required updates determined based on a comparison of the deployed resources with the first list; and sending an update list to the plurality of members providing the required updates indicated in the action list.

13. The method of claim 12 further comprising:

sending a first list to the plurality of members indicating the plurality of resources currently defined in the manifest;

receiving an action list from the plurality of members indicating updates required to effect correlation between the deployed resources and the resources defined in the manifest, the required updates determined based on a comparison of the deployed resources with the first list; and sending an update list to the plurality of members providing the required updates indicated in the action list.

14. The method of claim 12 further comprising:

monitoring an aggregated disk capacity of the plurality of member computing devices.

15. The method of claim 14 further comprising:

generating event logs for each of the plurality of members;

aggregating the event logs from the plurality of members; and providing at least one of a collective or individual performance view of the event logs.

16. The method of claim 12 further comprising:

providing failure management.

17. The method of claim 16 further comprising:

setting up monitors for events relating to aggregated performance of the members;

determining when at least one aggregated performance parameter has exceeded a monitor threshold value; and performing an action when the monitor threshold has been exceeded, the action at least one of bringing a new member computing device into service to assist in running the applications or removing one of the plurality of member computing devices from service.

18. The method of claim 12 further comprising:

providing load balancing between the members.

19. The method of claim 12 further comprising:

providing service level agreements that facilitate automatic enabling of members based on the source of a request to the applications.

\* \* \* \* \*